US000001341H

United States Statutory Invention Registration [19]

[11] Reg. Number: H1341

Hughes et al.

[43] Published: Aug. 2, 1994

[54] HIGH ENERGY PROPELLANT FORMULATION

[76] Inventors: Charles W. Hughes, 3594 Brighton Point Dr.; James H. Godsey, 7268 S. 2220 East; Robert F. Keller, 2071 Renoir Cir., all of Salt Lake City, Utah 84121

[21] Appl. No.: 627,169

[22] Filed: Dec. 14, 1990

[51] Int. Cl.[5] ..... C06B 45/10
[52] U.S. Cl. ..... 149/19.4
[58] Field of Search ..... 149/19.4

[56] References Cited

U.S. PATENT DOCUMENTS 4,216,039 8/1980 Pierce ..... 149/19.4
4,234,364 11/1980 Robinson ..... 149/19.4
4,379,903 4/1983 Reed et al. ..... 149/19.4
4,670,068 6/1987 Chi ..... 149/19.4
4,804,424 2/1989 Hinshaw ..... 149/19.4
4,925,504 5/1990 Sayles ..... 149/19.4

*Primary Examiner*—Edward A. Miller

[57] ABSTRACT

A high energy rocket propellant can be formed wherein the propellant binder has a cellulose acetate butyrate: polyethylene glycol ratio of about 0.01 to 0.03 on a weight basis.

18 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH ENERGY PROPELLANT FORMULATION

FIELD OF THE INVENTION

This invention relates to propellants for rockets and more particularly, this invention relates to a rocket propellant having about 22 to 27 weight percent binder and about 73 to 78 weight percent solids. Still more particularly, but without limitation thereto, this invention relates to a propellant having a binder using a specific range of ratios of cellulose acetate butyrate (CAB) to polyethylene glycol (PEG).

BACKGROUND OF THE INVENTION

There is a constant search for improved propellants that are easier to process, have improved mechanical properties, and are higher performance. This invention provides a very high performance nitrate ester plasticized polyether (NEPE) propellant based upon a unique cellulose acetate butyrate (CAB) polyethylene glycol (PEG) binder system.

Further, this invention provides a propellant with a long pot life, improved efficiency, low burn rate pressure sensitivity, excellent mechanical properties, high critical impact velocity, and a high delivered specific impulse.

OBJECTS OF THE INVENTION

An object of this invention is to develop an improved high energy propellant.

A further object of this invention is to develop an improved high energy propellant having optimal mechanical and ballistic properties.

SUMMARY OF THE INVENTION

These and other objects have been demonstrated by the present invention wherein the propellant binder has a cellulose acetate butyrate: polyethylene glycol ratio in the range of about 0.01 to 0.03 on a weight basis.

DESCRIPTION OF THE PREFERRED EMBODIMENT

Figure 1:
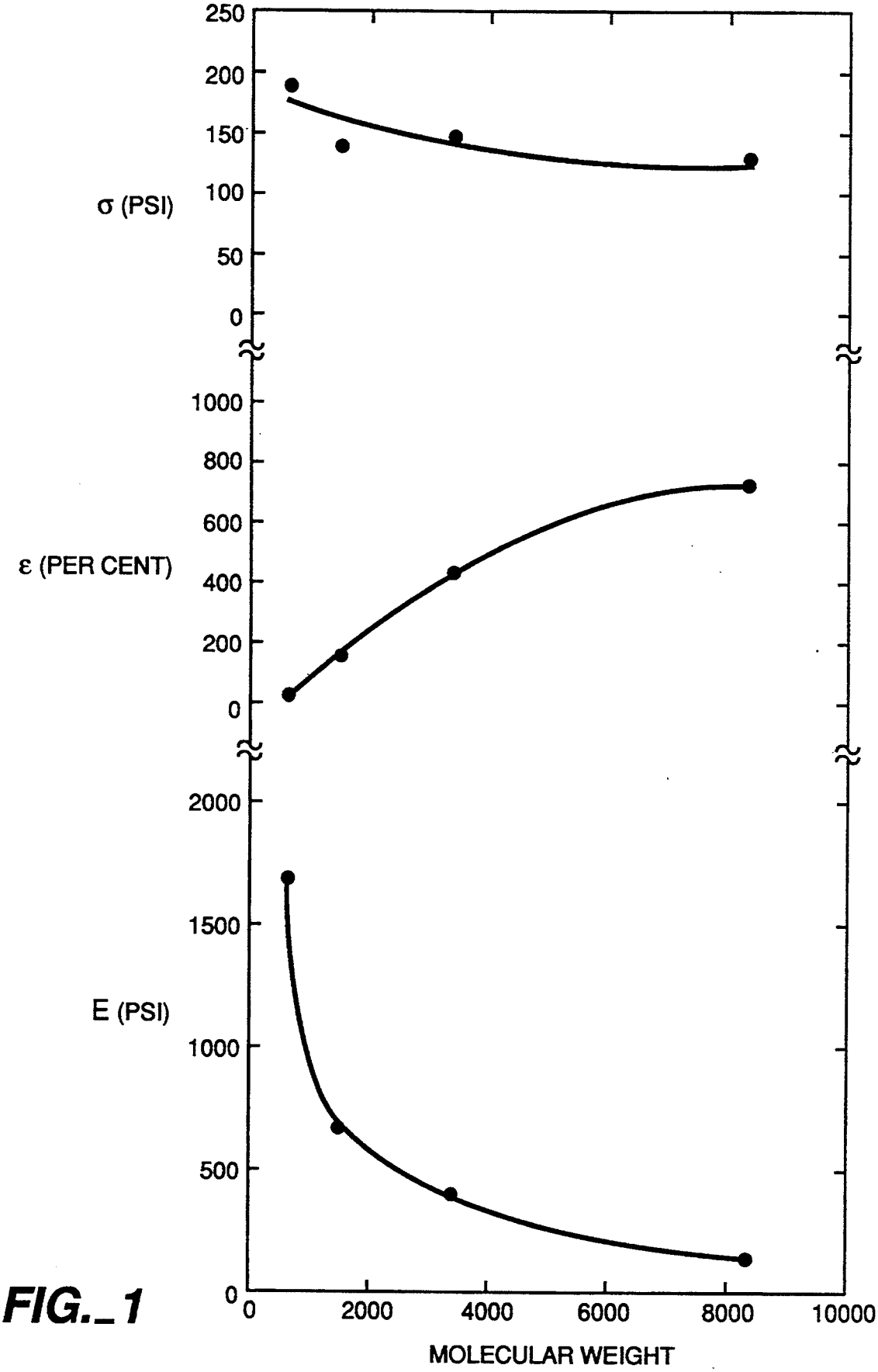
FIG. 1 shows graphs of the effect of PEG molecular weight on propellant mechanical properties.

The general composition of the high energy propellant is about 22 to 27 weight percent binder and about 73 to 78 weight percent solids. The binder itself has several components: two polymers, a plasticizer, is a curative, and two stabilizers. The binder also contains a trace amount of catalyst. The solids component of the propellant is comprised of a metanized fuel, an energetic filler, and an oxidizer.

Table I illustrates four examples of preferred propellant compositions, by weight percent. Examples I and II exemplify the most preferred formulations. It is to be understood that the values specified in Table I are approximate, and some variations from those shown are still within the scope of this invention.

TABLE I

| COMPONENTS | Percentage by Weight | | | |
|---|---|---|---|---|
| | Example I | Example II | Example III | Example IV |
| BINDER | | | | |
| Polymers | | | | |
| Polyethylene Glycol (PEG) | 6.25 | 6.25 | 11.65 | 5.02 |
| Cellulose Acetate Butyrate (CAB) | 0.06 | 0.06 | .00 | 0.20 |
| Plasticizer | | | | |
| Nitroglycerin (NG) | 19.02 | 19.02 | 8.06 | 20.18 |
| Crosslinking Curative | | | | |
| Desmodur N-100 | 0.88 | 0.88 | 1.74 | 0.80 |
| Stabilizer | | | | |
| 2 nitrodiphenylamine (2NDPA) | 0.19 | 0.19 | 0.08 | 0.20 |
| N-methyl-p-nitroaniline (MNA) | 0.60 | 0.60 | 0.47 | 0.60 |
| Cure Catalyst | | | | |
| Triphenyl bismuth (TPB) | 0.02 | 0.02 | 0.02 | 0.02 |
| SOLIDS | | | | |
| Fuel | | | | |
| Aluminum | 18.00 | 18.00 | 24.00 | 16.00 |
| Energetic Filler | | | | |
| Cyclotetramethylene Tetranitramine (HMX) | 47.00 | 46.00 | 12.00 | 57.00 |
| Particle Size | 2μ–11μ | 2μ–11μ | 2μ | 57μ/2μ |
| Ratio | 1:1 | 1:1 | — | 34:23 |
| Oxidizer | | | | |
| Ammonium Perchlorate (AP) | 8.00 | 9.00 | 42.00 | |
| Particle Size | 20μ–50μ | 5μ–20μ | 200μ | |
| Ratio | 1:1 | 1:1 | — | — |

Examples I and II in the Table, which represent the most preferred embodiments of the present invention, have the following mechanical properties:

| | Example I | Example II |
|---|---|---|
| Modulus (psi) | 430 | 545 |
| Tensile strength (psi) | 92 | 99 |
| Elongation (%) | 270 | 273 |

These values are determined at a 2 in/min pull rate at 80° F. The above values were obtained from a 600 gallon mixed batch.

The preferred polymers are polyethylene glycol (PEG) and cellulose acetate butyrate (CAB). The polymer PEG functions to give physical strength to the binder when crosslinked with itself and/or CAB. Polypropylene glycol can be used for some PEG but the plasticizers are less soluble in it so that in most cases it is preferred to use PEG as the polyol polymer. PEG and CAB also serve as sources of fuel in the propellant.

CAB as a crosslinker provides physical strength by improving tensile strength and the modulus of elasticity. In other embodiments, such chemicals as cellulose acetate, cellulose butyrate, trimethylol propane, or glycerin can be substituted in part or in whole for the CAB component of the inventive fuel. Preferably a mixture of cellulose acetate and cellulose butyrate are used in combination as substitutes for CAB rather than either alone.

In the present invention, the mechanical properties of the propellant can be modified by varying the molecular weight of the PEG employed in the propellant formulation. Molecular weight of the polyether and the modulus of elasticity vary inversely but the elongation varies directly. Thus, increasing the molecular weight of the polyether causes a steady drop in the modulus of elasticity and increases the elongation in the resultant fuel. The molecular weight of the PEG has a direct bearing on the crosslink density and gelling efficiency of the present propellant, particularly at the higher Pl:P0 (i.e. plasticizer: polymer) levels due to the dilution of the polymer. The various effects of PEG molecular weight modulation can be seen in Tables II and III.

TABLE II

EFFECT OF PEG MOLECULAR WEIGHT
70% Solids, 2.8 Pl:Po

| Approx. MW | $\sigma$ (psi) | $\epsilon$ (%) | E (psi) |
|---|---|---|---|
| 430 | 64 | 37 | 680 |
| 1020 | 70 | 56 | 728 |
| 1376 | 77 | 100 | 510 |
| 3240 | 65 | 292 | 296 |
| 4100 | 67 | 411 | 204 |

TABLE III

EFFECT OF POLYETHER MOLECULAR WEIGHT ON MECHANICAL PROPERTIES
75% Solids, 1.2 NCO:OH

| Approx. MW | PL:Po | $\sigma_m$ (psi) | $\epsilon_m$ (%) | $\epsilon_f$ (%) | E (psi) |
|---|---|---|---|---|---|
| 1000 | 2.1 | 123 | 25 | 25 | 1040 |
| 1500 | 2.1 | 130 | 23 | 23 | 1100 |
| 3100 | 2.1 | 77 | 29 | 145 | 685 |
| 4000 | 2.1 | 72 | 260 | 260 | 425 |
| 7800 | 2.1 | 81 | 970 | 970 | 185 |
| 9400 | 2.1 | 82 | 1170 | 1170 | 215 |
| 1000 | 2.8 | 111 | 24 | 24 | 880 |
| 1500 | 2.8 | 114 | 25 | 25 | 810 |
| 3100 | 2.8 | 59 | 24 | 93 | 550 |
| 4000 | 2.8 | 54 | 295 | 295 | 455 |
| 7800 | 2.8 | 68 | 1000 | 1000 | 160 |
| 8100 | 2.8 | 69 | 1100 | 1100 | 130 |
| 9400 | 2.8 | 57 | 1130 | 1130 | 105 |

FIG. 1 also demonstrates the effects of PEG molecular weight on the mechanical properties of the propellant. Thus, various mechanical properties of the propellant can be modified by adjustment of the ingredients (i.e. ones selected and the amounts) to meet the particular requirements of a specific missile system, and thereby optimize its efficiency. PEG with molecular weights of 1000-8000 can be used depending on the desired mechanical properties. The preferred PEG has a nominal molecular weight of about 3500.

The mechanical properties of the propellant also vary with the ratio of CAB to PEG. It is desirable to have both high elongation and high tensile strength. However, while tensile strength is proportional to the CAB:-PEG ratio, elongation is inversely proportional to said ratio. Taking this into consideration, it has been found that a CAB:PEG weight ratio in the range of about 0.001 to 0.05 is suitable. Where nitrocellulose is used for CAB, we have found the ratios of 0.001 to 1.0 to be suitable. We have found ratios of CAB in the range of about 0.01 to 0.03 to be preferred as producing on balance overall good results.

Another embodiment of the present invention allows a modification of the mechanical properties of the manufactured fuel by blending polyethers of various molecular weights. This effect is shown in Table IV.

TABLE IV

EFFECT OF POLYMER BLENDS
70% Solids, 2.1 Pl:Po, 1.2 NCO:OH

| Approx. MW | $\sigma_m$ (psi) | $\epsilon_m$ (%) | ($\epsilon_f$ (%) | E (psi) |
|---|---|---|---|---|
| 4000 | 72 | 260 | 260 | 425 |
| 4000/7800 | 74 | 530 | 530 | 350 |
| 7800 | 81 | 970 | 970 | 185 |
| 3100 | 77 | 29 | 145 | 685 |
| 3100/8100 | 76 | 745 | 745 | 295 |
| 8100 | 85 | 960 | 960 | 315 |
| 1500 | 130 | 23 | 23 | 1095 |
| 1500/3100 | 88 | 26 | 58 | 795 |
| 3100 | 77 | 29 | 145 | 685 |
| 1500 | 130 | 23 | 23 | 1095 |
| 1500/8100 | 56 | 485 | 485 | 325 |
| 8100 | 85 | 960 | 960 | 315 |

All blends were OH equivalent ratio of 1:1.

In alternate embodiments, other long chain polyols may be used in part or in whole in place of PEG. For instance, the mechanical properties can be modified by blending the PEG component of the fuel with various amounts of polypropylene glycol (PPG) to form block copolymers. This effect is demonstrated in Table V. However, the use of PEG/PPG tends to yield a poor modulus. The inclusion of polypropylene for PEG tends to reduce the solubility of plasticizers and thus in most cases PEG alone is preferred and used.

The preferred plasticizer is nitroglycerin (NG), a high energy compound. The mixing of CAB and NG results in a material that is formable and plastic. Its use in the present invention results in improved mechanical properties and higher performance for the binder.

In alternate embodiments, other nitrate esters generally may serve as suitable plasticizers. Butanethol trinitrate (BTTN), triethylene glycol dinitrate (TEGDN), diethylene glycol dinitrate (DEGDN), and trimethylolethane trinitrate (TMETN) are examples of plasticizers that can be utilized within the purview of the present invention.

The crosslinking curative of the subject invention is responsible for crosslinking the various components of the fuel. A polyfunctional isocyanate containing the biuret trimer of hexamethylene diisocyanate is preferred. It has an NCO functionality of at least 3.

An especially suitable curative is Desmodur N-100, commercially available from Mobay Chemical Co., which is a complex mixture of biurets, uretediones, isocyanurates and unreacted hexamethylene diisocyanate. Optimal crosslinking and mechanical properties are obtained when the stabilizer for NG, N-methyl-p-nitroaniline (MNA), which is discussed later, acts to stabilize the complete propellant.

TABLE V

COMPARISON OF PEG WITH PEG/PPG COPOLYMERS

| Parameter | | | | | | |
|---|---|---|---|---|---|---|
| % Solids | 73 | 73 | 73 | 75 | 75 | 75 |
| Wt % PEG/ Wt % PPG | 100/0 | 10/90 | 40/60 | 50/50 | 50/50 | 70/30 |
| PI:Po | 2.1 | 1.8 | 1.72 | 2.1 | 2.8 | 2.8 |
| NCO:OH | 1.2 | 1.2 | 1.3 | 1.2 | 1.2 | 1.2 |
| Mechanical Properties, 2 ipm | | | | | | |
| $\sigma$ (psi) | 95 | 62 | 69 | 52 | 53 | 62 |
| $\epsilon$ (%) | 500 | 698 | 706 | 685 | 890 | 1000 |
| E (psi) | 350 | 135 | 202 | 165 | 105 | 140 |

In additional embodiments of the present invention, other polyfunctional isocyanates may be successfully employed as crosslinking curatives. Pentaerythritol tetraisocyanate is a chemical which can be considered as an alternative curing agent. Difunctional isocyanates tend to increase the elasticity of the resulting fuel to a great degree, and so are generally less preferred.

Organo bismuth compounds are used as cure catalysts. Triphenyl bismuth (TPB) is the preferred cure catalyst in the present invention. It functions to speed up the crosslinking process and helps to provide a very long pot life or working life (i.e., until a viscosity of about 40 kilopoise is reached). Because TPB functions as a relatively slow reacting cure catalyst, it is particularly advantageous with large missiles where the set time for the fuel is longer. Competing and interfering reactions are minimized in this system.

Other organo metal cure catalysts can be employed in place of TPB. Examples are trialkyl bismuths, such as triethyl bismuth. Other metals can be used but they can have adverse effects unrelated to cure. The choice depends on the final fuel qualities desired, and accommodations to be made to the exigencies of the particular production process employed. The considerations involved include the size of the missile for which the fuel is being manufactured.

The metal used to form the metallized fuel used in the preferred embodiment of the present invention is free metal aluminum (Al). Al reacts with the oxidizers primarily to provide heat as a product of the combustion process. This fuel is particularly useful in larger missiles, and may be eliminated in smaller tactical missiles, or for minimum smoke missiles.

In other embodiments, different metallized fuels can be employed with that of the preferred embodiment or as substitutes for it, depending on the nature of the fuel desired. Suitable other metals for use in metallized fuels are boron and beryllium (although the latter is quite toxic).

The energetic filler employed in the preferred embodiment of the present invention is cyclotetramethylene tetranitramine (HMX), which generates heat and gases. Also useful in this capacity is cyclotrimethylene trinitramine (RDX). As can be seen in Table 6, the particle size and ratio of the energetic filler can be varied to fit the needs of a particular fuel requirement. An increase in quantity enhances the energetic nature of the fuel. HMX size affects the mechanical properties of the propellant. The modulus of elasticity is not dramatically affected by HMX diameter. However, tensile strength and especially percent elongation increase dramatically as the particle size decreases. The particle size is varied to obtain a proper viscosity for processing, but the optimum mechanical properties are achieved with the finest possible HMX.

TABLE VI

Effect of HMX Size on Mechanical Properties

| | | |
|---|---|---|
| HMX Size ($\mu$) | 4 | 2 |
| Tensile Strength (psi) | 90 | 97 |
| Elongation (%) | 290 | 450 |
| Modulus (psi) | 430 | 370 |

The preferred oxidizer in the present invention is ammonium perchlorate (AP), which functions to oxidize all of the hydrocarbons and the metal, aluminum, to generate heat and gases. AP is also used to control the burning rate of the propellant. As can be seen in Table I, the particle size and ratio of the oxidizer can be varied to fit the needs of a particular fuel requirement.

The propellants provided in Examples I and II specified in Table I have the following typical properties:

TABLE VII

| | Example I | Example II |
|---|---|---|
| Density (lb/in$^3$) | 0.0665 | 0.0665 |
| Burning rate (1000 psi, 80° F., in/sec) | 0.42 | 0.49 |
| Specific impulse, lbf-sec/lbm | 271.5 | 271.4 |

This invention has been described in detail with particular reference to certain preferred embodiments thereof, but it will be understood that variations and modifications can be effected within the spirit and scope of the invention.

What is claimed is:

1. A propellant composition comprising:
polyethylene glycol;
a nitrate ester;
the biuret trimer of hexamethylene diisocyanate;
2-nitrodiphenylamine;
N-methyl-p-nitroaniline;
an organo-bismuth compound;
a metal selected from aluminum, boron and beryllium;
cyclotetramethylene tetranitramine;
ammonium perchlorate; and,
optionally at least one crosslinking agent selected from the group consisting of trimethylol propane, glycerin, cellulose acetate butyrate, cellulose acetate and cellulose butyrate alone, or said acetate and butyrate in combination.

2. The propellant according to claim 1 wherein said organo bismuth compound is triphenyl bismuth.

3. The propellant of claim 1 wherein the crosslinking agent is chosen from the group consisting of cellulose acetate butyrate, cellulose acetate, cellulose butyrate, or a combination of the acetate and the butyrate, the weight ratio of cellulose acetate butyrate, cellulose acetate, cellulose butyrate or a combination thereof to said polyethylene glycol being about 0.01 to 0.03.

4. The propellant according to claim 1 wherein said metal is aluminum.

5. The propellant of claim 1 wherein said bioret trimer of hexamethylene diisocyanate is a polyfunctional isocyanate having an NCO functionality of at least 3.

6. The propellant according to claim 1 wherein said nitrate ester is nitroglycerine.

7. The propellant of claim 1 wherein said polyethylene glycol has a hydroxyl functionality of about 2.

8. The propellant according to claim 1 wherein said polyethylene glycol is in the form of a polymer having a molecular weight of between about 1000 and 8000.

9. The propellant of claim 1 wherein said cellulose acetate butyrate has a hydroxyl equivalent weight of about 1100.

10. The propellant of claim 1 wherein the ratio of isocyanate functional groups of said biuret trimer of hexamethylene diisocyanate to the combined hydroxyl functionality of said polyethylene glycol and cellulose acetate butyrate is about 1.1 to 1.3.

11. The propellant of claim 1 wherein said cyclotetramethylene tetranitramine has an average particle size of about 6.5 $\mu$.

12. A propellant composition comprises by weight percent:

about 6.25 polyethylene glycol,
about 0.06 cellulose acetate butyrate,
about 19.02 nitroglycerin,
about 0.88 biuret trimer of hexamethylene diisocyanate,
about 0.19 2-nitrodiphenylamine,
about 0.60 N-methyl-p-nitroaniline,
about 0.02 triphenyl bismuth,
about 18.0 aluminum,
about 46.0 cyclotetramethylene tetranitramine, and
about 9.0 ammonium perchlorate.

13. The propellant of claim 2 which further comprises a trace amount of triphenyl bismuth.

14. The propellant of claim 12 wherein said polyethylene glycol has nominal molecular weight of 3500.

15. The propellant of claim 12 wherein said bioret trimer of hexamethylene diisocyanate is a polyfunctional isocyanate having an NCO functionality of at least 3, and wherein said polyethylene glycol has a hydroxyl functionality of about 2 and said cellulose acetate butyrate has a hydroxyl equivalent weight of about 1100.

16. The propellant of claim 12 wherein the ratio of isocyanate functional groups in said biuret trimer of hexamethylene diisocyanate to the combined hydroxyl functionality of said polyethylene glycol and cellulose acetate butyrate is about 1.1 to 1.3.

17. The propellant of claim 12 wherein said cyclotetramethylene tetranitramine has an average particle size of about 6.5$\mu$.

18. A propellant composition comprising by weight percent:

About 6.25 polyethylene glycol,
about 0.06 cellulose acetate butyrate,
about 19.02 nitroglycerin,
about 0.88 biuret trimer of hexamethylene diisocyanate,
about 0.19 2-nitrodiphenylamine,
about 0.60 N-methyl-p-nitroaniline,
about 0.02 triphenyl bismuth,
about 18.0 aluminum,
about 47.0 cyclotetramethylene tetranitramine, and
about 8.0 ammonium perchlorate.

* * * * *